United States Patent
Tang et al.

(10) Patent No.: US 10,698,717 B2
(45) Date of Patent: Jun. 30, 2020

(54) ACCELERATOR VIRTUALIZATION METHOD AND APPARATUS, AND CENTRALIZED RESOURCE MANAGER

(71) Applicant: HUAWEI TECHNOLOGIES CO., LTD., Shenzhen, Guangdong (CN)

(72) Inventors: Chaofei Tang, Shenzhen (CN); Zhiming Yao, Shenzhen (CN); Kun Xiao, Shenzhen (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 153 days.

(21) Appl. No.: 15/933,323

(22) Filed: Mar. 22, 2018

(65) Prior Publication Data

US 2018/0210752 A1    Jul. 26, 2018

Related U.S. Application Data

(63) Continuation of application No. PCT/CN2016/084022, filed on May 31, 2016.

(30) Foreign Application Priority Data

Sep. 25, 2015    (CN) .......................... 2015 1 0621728

(51) Int. Cl.
   *G06F 9/455* (2018.01)
   *G06F 9/46* (2006.01)

(52) U.S. Cl.
   CPC .......... *G06F 9/45558* (2013.01); *G06F 9/455* (2013.01); *G06F 9/467* (2013.01);
   (Continued)

(58) Field of Classification Search
   None
   See application file for complete search history.

(56) References Cited

U.S. PATENT DOCUMENTS

| 7,502,884 B1 | 3/2009 | Shah et al. |
| 2006/0146057 A1 | 7/2006 | Blythe |

(Continued)

FOREIGN PATENT DOCUMENTS

| CN | 1797345 A | 7/2006 |
| CN | 102314377 A | 1/2012 |

(Continued)

*Primary Examiner* — Kenneth Tang
(74) *Attorney, Agent, or Firm* — Womble Bond Dickinson (US) LLP

(57) ABSTRACT

An accelerator virtualization method is disclosed. The method includes: selecting, by a centralized resource manager, a matched physical accelerator from a physical accelerator resource pool as a matching physical accelerator according to to-be-created virtual accelerator information in a virtual machine resource configuration command; sending, by the centralized resource manager, a first virtual machine creation command to a virtual machine monitor, so that the virtual machine monitor can create a first virtual machine including a first virtual accelerator corresponding to the matching physical accelerator; or sending, by the centralized resource manager, a second virtual machine creation command, which includes a description information obtaining identifier, to a virtual machine monitor, so that the virtual machine monitor can create a second virtual machine after receiving the second virtual machine creation command, and the second virtual machine generates a second virtual accelerator after obtaining description information according to the description information obtaining identifier.

15 Claims, 6 Drawing Sheets

(52) U.S. Cl.
    CPC .............. *G06F 2009/45562* (2013.01); *G06F 2009/45583* (2013.01); *G06F 2009/45595* (2013.01)

(56) References Cited

U.S. PATENT DOCUMENTS

| | | |
|---|---|---|
| 2007/0220217 A1 | 9/2007 | Shankara |
| 2011/0010721 A1 | 1/2011 | Gupta et al. |
| 2011/0161972 A1 | 6/2011 | Dillenberger et al. |
| 2012/0005678 A1 | 1/2012 | Ge et al. |
| 2014/0096132 A1 | 4/2014 | Wang et al. |
| 2014/0351811 A1 | 11/2014 | Kruglick |
| 2015/0089495 A1* | 3/2015 | Persson ............... G06F 9/45533 718/1 |
| 2015/0261550 A1* | 9/2015 | Kruglick ............. G06F 9/44505 705/26.41 |
| 2016/0210167 A1* | 7/2016 | Bolic ................ G06F 9/45558 |
| 2018/0210752 A1* | 7/2018 | Tang ....................... G06F 9/455 |

FOREIGN PATENT DOCUMENTS

| | | |
|---|---|---|
| CN | 102650950 A | 8/2012 |
| CN | 102667724 A | 9/2012 |
| CN | 104156663 A | 11/2014 |
| CN | 104541242 A | 4/2015 |
| CN | 105159753 A | 12/2015 |
| WO | 2015042684 A1 | 4/2015 |

\* cited by examiner

ACCELERATOR VIRTUALIZATION METHOD AND APPARATUS, AND CENTRALIZED RESOURCE MANAGER

CROSS-REFERENCE TO RELATED APPLICATIONS

This application is a continuation of International Application No. PCT/CN2016/084022, filed on May 31, 2016, which claims priority to Chinese Patent Application No. 201510621728.0, filed on Sep. 25, 2015. The disclosures of the aforementioned applications are hereby incorporated by reference in their entireties.

TECHNICAL FIELD

Embodiments of the present invention relates to the Internet field, and in particular, to accelerator virtualization methods and apparatus, and a centralized resource manager.

BACKGROUND

A virtualization technology can implement dynamic allocation, flexible scheduling, and cross-domain sharing of Internet resources to improve IT resource utilization, and therefore becomes a new development trend of the Internet.

An accelerator is a type of Internet resource and a function unit. It offloads some original CPU functions onto the accelerator for processing, to reduce load on a CPU. Currently, widely used accelerators include graphics accelerators, cryptographic accelerators, video codec accelerators, compression accelerators, and the like. However, currently, it is increasingly difficult to meet an offload requirement of the CPU using a single accelerator. To improve performance of the accelerator, the accelerator urgently needs to be combined with an Internet resource virtualization technology. In a VirtIO solution, a virtual machine monitor creates a pair of transmit and receive queues for each virtual acceleration resource. The transmit and receive queues are implemented based on a shared memory. The virtual acceleration resource accesses a physical acceleration resource using the transmit and receive queues. The virtual machine monitor schedules the transmit and receive queues of each virtual acceleration resource, to implement access to the physical acceleration resource.

In the prior art, virtualization of the Internet resources generally has two methods: a VirtIO solution, and an SRIOV (single-root IO virtualization) solution. In the VirtIO solution, a virtual machine monitor (also referred to as virtual machine manager, or hypervisor hypervisor) creates a pair of transmit and receive queues for each virtual resource, and the virtual resource accesses a physical resource using the transmit and receive queues and by scheduling by the virtual machine monitor. The SRIOV solution is a PCIe bus-based IO virtualization technology, and a physical resource is interconnected with a CPU using a PCIe bus. In the SRIOV solution, a transmit and receive queue is integrated into hardware using software, and the hardware can be directly accessed from a virtual machine, thereby improving performance.

With the virtualization technology, a physical resource may be virtualized into multiple virtual resources. The multiple virtual resources are combined to form a virtual machine. Service processing units may be deployed on the virtual machine to implement different service functions. A typical virtualization system, as shown in FIG. 1, includes a centralized resource manager 101, a virtual machine monitor 102, and virtual machines 103 and 104. The centralized resource manager and the virtual machine monitor may be implemented based on software of a physical CPU. The software may be some function modules of an operating system or some relatively independent function software; a specific form is not limited. The centralized resource manager 101 is configured to manage various physical resources 107, and specific representative products include open-source software openstack, VMware company's vCenter, Huawei's FusionSphere, and the like. The virtual machine monitor 102 is configured to manage virtual resources. As shown in FIG. 1, a service processing unit 105 is deployed on the virtual machine 103, and a service processing unit 106 is deployed on the virtual machine 104. Workloads separately run on the service processing units 105 and 106. There may be multiple service loads running on each service processing unit. A virtual resource on the virtual machine may be divided by attribute into a virtual computing resource, a virtual storage resource, a virtual network interface card resource, and the like. Likewise, a physical resource may be divided into a physical computing resource, a physical storage resource, and a physical network interface card resource. The virtual machine accesses a corresponding physical resource using a virtual resource and transfers a workload to the corresponding physical resource.

However, virtualization of an accelerator cannot be implemented using a prior-art virtualization technology, and a virtual machine including a virtual accelerator cannot be created. As a result, the accelerator cannot be used in a virtual machine.

SUMMARY

Embodiments of the present invention provide an accelerator virtualization method and apparatus, and a centralized resource manager, so as to resolve a problem that accelerator virtualization cannot be implemented in the prior art.

To resolve the foregoing technical problem, the embodiments of the present invention disclose the following technical solutions:

According to a first aspect, an accelerator virtualization method is provided, where the method is applied to a host, a centralized resource manager and a virtual machine monitor run on the host, and the method includes:

receiving, by the centralized resource manager, a virtual machine resource configuration command having to-be-created virtual accelerator information;

selecting, by the centralized resource manager, a matched physical accelerator from a physical accelerator resource pool as a matching physical accelerator according to the to-be-created virtual accelerator information in the virtual machine resource configuration command;

generating, by the centralized resource manager, description information describing the matching physical accelerator; and sending, by the centralized resource manager, a first virtual machine creation command to the virtual machine monitor, where the first virtual machine creation command includes the description information, so that after receiving the first virtual machine creation command, the virtual machine monitor creates a first virtual machine including a first virtual accelerator corresponding to the matching physical accelerator, where the first virtual accelerator is generated using the description information; or sending, by the centralized resource manager, a second virtual machine creation command to the virtual machine monitor, where the second virtual machine creation command includes a description information obtaining identifier, so that the virtual machine monitor can create a second virtual machine after receiving the second virtual machine creation command, and the second virtual machine generates a second virtual accelerator after obtaining the description information according to the description information obtaining identifier.

In one embodiment, before the receiving, by the centralized resource manager, a virtual machine resource configuration command, the method further includes:

obtaining, by the centralized resource manager, information of a physical accelerator, where the physical accelerator includes at least a local physical accelerator or a remote physical accelerator; and generating, by the centralized resource manager, a physical accelerator information file according to the information of the physical accelerator to generate the physical accelerator resource pool, and where the selecting, by the centralized resource manager, a matched physical accelerator from a physical accelerator resource pool as a matching physical accelerator according to the to-be-created virtual accelerator information in the virtual machine resource configuration command includes:

selecting, by the centralized resource manager, matched information of the physical accelerator from the physical accelerator information file according to the to-be-created virtual accelerator information, and using a physical accelerator corresponding to the matched information of the physical accelerator as the matching physical accelerator.

In another embodiment, the selecting, by the centralized resource manager, a matched physical accelerator from a physical accelerator resource pool as a matching physical accelerator includes:

selecting, by the centralized resource manager, the matched matching physical accelerator from the physical accelerator resource pool according to a physical accelerator location; and/or selecting, by the centralized resource manager, the matched matching physical accelerator from the physical accelerator resource pool according to a physical accelerator load.

In another embodiment, the matching physical accelerator is not on the host, and after the virtual machine monitor creates the first virtual machine or the second virtual machine, the method further includes:

sending, by the virtual machine monitor, a communication address and a matching physical accelerator identifier to a remote accelerator management unit on a node, where the matching physical accelerator is located on the node, so that the virtual machine monitor communicates with the remote accelerator management unit using the communication address, and the remote accelerator management unit communicates with a corresponding matching physical accelerator using the matching physical accelerator identifier.

In one embodiment, after the centralized resource manager creates the first virtual machine or the second virtual machine, the method further includes:

transferring, by the virtual accelerator, an acceleration request to the matching physical accelerator for processing, where the acceleration request is sent by a service unit on the virtual machine; and returning a processing result of the matching physical accelerator to the service unit, where the virtual accelerator is the first virtual accelerator or the second virtual accelerator.

In another embodiment, the matching physical accelerator is not on the host, and the transferring, by the virtual accelerator, an acceleration request to the matching physical accelerator for processing, where the acceleration request is sent by a service unit on the virtual machine; and returning a processing result of the matching physical accelerator to the service unit includes:

sending, by the virtual accelerator, a handshake protocol-based handshake request to the remote accelerator management unit and receiving a handshake success response fed back by the remote accelerator management unit;

sending, by the virtual accelerator, the acceleration request to the remote accelerator management unit, so that the remote accelerator management unit can send the acceleration request to a corresponding matching physical accelerator for processing;

receiving, by the virtual accelerator, an acceleration request response sent by the remote accelerator management unit, where the acceleration request response includes the processing result that is returned to the remote accelerator management unit by the matching physical accelerator after the matching physical accelerator processes the acceleration request; and sending, by the virtual accelerator, the acceleration request response to the service unit, where the virtual accelerator is the first virtual accelerator or the second virtual accelerator.

According to a second aspect, an accelerator virtualization apparatus is provided, where the apparatus is applied to a host, the apparatus includes a centralized resource manager and a virtual machine monitor, and the centralized resource manager includes:

a receiving unit, configured to receive a virtual machine resource configuration command, where the virtual machine resource configuration command includes to-be-created virtual accelerator information;

a matching physical accelerator selection unit, configured to select a matched physical accelerator from a physical accelerator resource pool as a matching physical accelerator according to the to-be-created virtual accelerator information in the virtual machine resource configuration command received by the receiving unit;

a generation unit, configured to generate description information describing the matching physical accelerator; and a sending unit, configured to send a first virtual machine creation command to the virtual machine monitor, where the first virtual machine creation command includes the description information, so that after receiving the first virtual machine creation command, the virtual machine monitor can create a first virtual machine including a first virtual accelerator corresponding to the matching physical accelerator, where the first virtual accelerator is generated using the description information; or the sending unit, configured to send a second virtual machine creation command to the virtual machine monitor, where the second virtual machine creation command includes a description information obtaining identifier, so that the virtual machine monitor can create a second virtual machine after receiving the second virtual machine creation command, and the second virtual machine generates a second virtual accelerator after obtaining the description information according to the description information obtaining identifier.

In one embodiment, the centralized resource manager further includes:

a physical accelerator information obtaining unit, configured to obtain information of a physical accelerator, where the physical accelerator includes at least a local physical accelerator or a remote physical accelerator; and a physical accelerator resource pool generation unit, configured to generate a physical accelerator information file according to the information of the physical accelerator to generate the physical accelerator resource pool, and where the matching physical accelerator selection unit is further configured to: select matched information of the physical accelerator from the physical accelerator information file according to the to-be-created virtual accelerator information, and use a physical accelerator corresponding to the matched information of the physical accelerator as the matching physical accelerator.

In another embodiment, the matching physical accelerator selection unit is further configured to select the matched matching physical accelerator from the physical accelerator resource pool according to a physical accelerator location; and/or the matching physical accelerator selection unit is further configured to select the matched matching physical accelerator from the physical accelerator resource pool according to a physical accelerator load.

In one embodiment, the matching physical accelerator is not on the host, and after the virtual machine monitor creates the first virtual machine or the second virtual machine, the virtual machine monitor is further configured to send a communication address and a matching physical accelerator identifier to a remote accelerator management unit on a node, where the matching physical accelerator is located on the node, so that the virtual machine monitor communicates with the remote accelerator management unit using the communication address, and the remote accelerator management unit communicates with a corresponding matching physical accelerator using the matching physical accelerator identifier.

In one embodiment, after the centralized resource manager creates the first virtual machine or the second virtual machine, the virtual accelerator is further configured to: transfer an acceleration request to the matching physical accelerator for processing, where the acceleration request is sent by a service unit on the virtual machine, and return a processing result of the matching physical accelerator to the service unit, where the virtual accelerator is the first virtual accelerator or the second virtual accelerator.

In another embodiment, the matching physical accelerator is not on the host, and the virtual accelerator is further configured to send a handshake protocol-based handshake request to the remote accelerator management unit and receive a handshake success response fed back by the remote accelerator management unit;

the virtual accelerator is further configured to send the acceleration request to the remote accelerator management unit, so that the remote accelerator management unit can send the acceleration request to a corresponding matching physical accelerator for processing;

the virtual accelerator is further configured to receive an acceleration request response sent by the remote accelerator management unit, where the acceleration request response is the processing result that is returned to the remote accelerator management unit by the matching physical accelerator after the matching physical accelerator processes the acceleration request; and the virtual accelerator is further configured to send the acceleration request response to the service unit, where the virtual accelerator is the first virtual accelerator or the second virtual accelerator.

According to a third aspect, a host configured to implement accelerator virtualization is provided. The host includes a processor and a memory. The processor is configured to read code stored in the memory to run a virtual machine monitor and a centralized resource manager, and the virtual machine monitor and the centralized resource manager are configured to execute the method disclosed in the first aspect and the implementations of the first aspect.

The embodiments of the present invention disclose an accelerator virtualization method. In the embodiments of the present invention, virtualization of a physical accelerator can be implemented by means of interaction between a centralized resource manager and a virtual machine monitor, laying a foundation for more convenient use of these physical accelerators subsequently. In addition, accelerator virtualization in the embodiments of the present invention is implemented based on the centralized resource manager and the virtual machine monitor and requires slight software modification, and therefore is easy to implement.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following embodiments of the present invention provide an accelerator virtualization method and apparatus, and a centralized resource manager, so as to implement accelerator virtualization and improve a resource sharing degree.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 7:
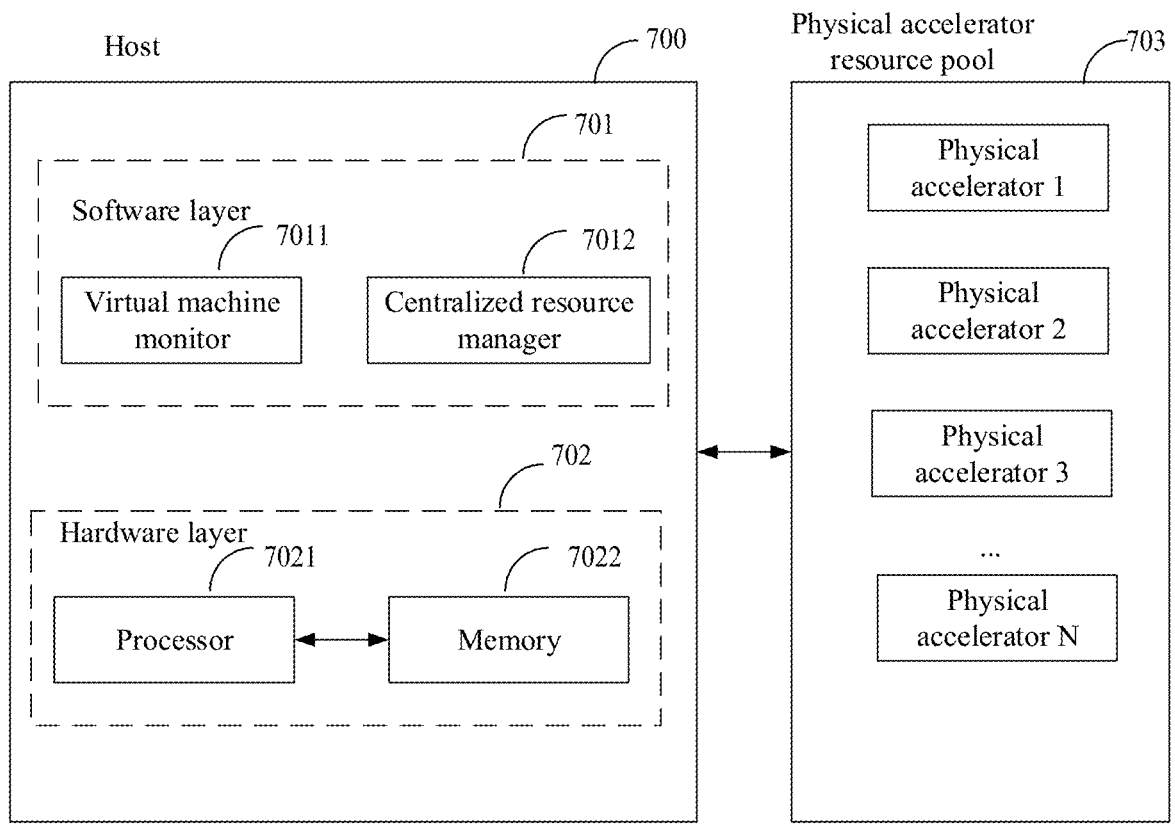
FIG. 7 is a schematic diagram of an architecture of a system according to an embodiment of the present invention.

FIG. 7 is a schematic diagram of an architecture of a system according to an embodiment of the present invention. As shown in FIG. 7, a node on which a host 700 is located includes a software layer 701 and a hardware layer 702. The software layer 701 includes a centralized resource manager 7012 and a virtual machine monitor 7011. The hardware layer may include a processor 7021, a memory 7022, and the like.

In addition, the system in an embodiment of the present invention further includes a physical accelerator resource pool 703. The physical accelerator resource pool 703 includes multiple physical accelerators, for example, a physical accelerator 1, a physical accelerator 2, . . . , and a physical accelerator N shown in FIG. 7.

Figure 1:
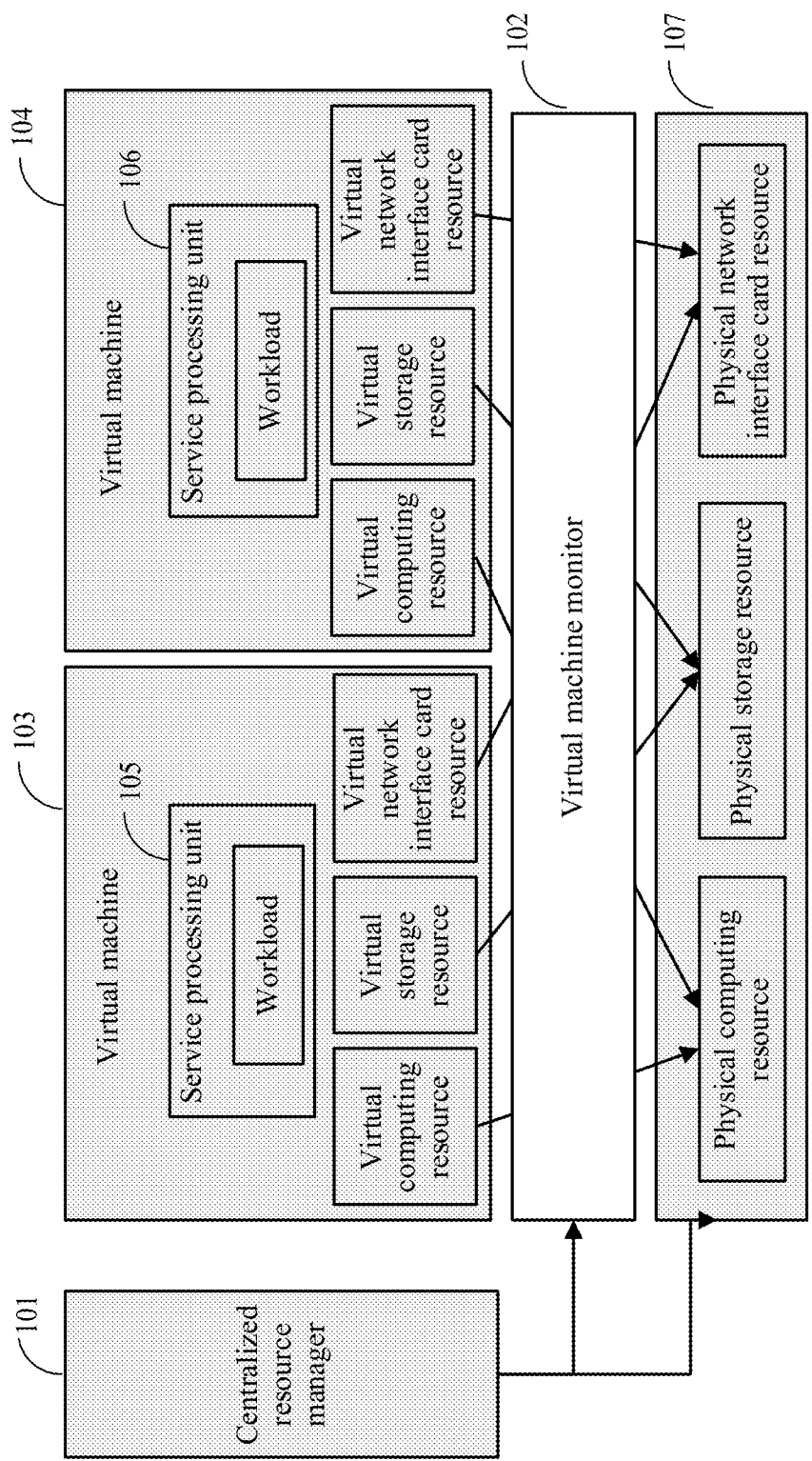
FIG. 1 is a schematic diagram of a virtualization system in the prior art.
Figure 2:
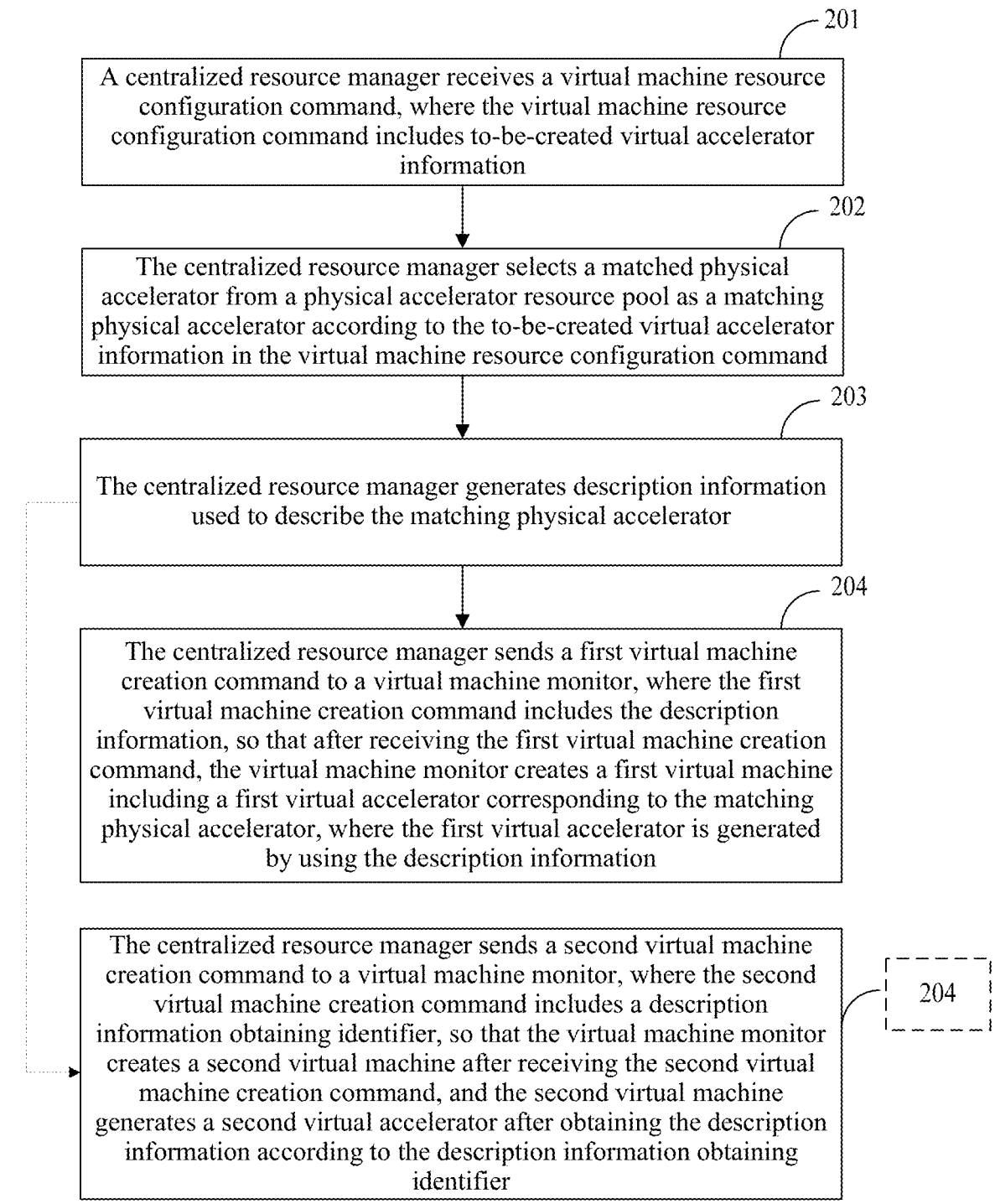
FIG. 2 is a flowchart of an accelerator virtualization method according to an embodiment of the present invention.

Based on the system architecture shown in FIG. 7, accelerator virtualization can be implemented in an embodiment of the present invention. FIG. 2 is a flowchart of an accelerator virtualization method according to an embodiment of the present invention. As shown in FIG. 2, the method is applied to a host. A centralized resource manager and a virtual machine monitor run on the host. The method includes the following operations.

Operation 201. The centralized resource manager receives a virtual machine resource configuration command, where the virtual machine resource configuration command includes to-be-created virtual accelerator information.

The virtual machine resource configuration command may be from operation and maintenance software, which, for example, may be relatively independent software such as MANO, or may be a software module within large software. The operation and maintenance software sends the virtual machine resource configuration command to the centralized resource manager when learning that application software has a requirement for a virtual accelerator. The foregoing technology is the prior art, and details are not described herein.

The virtual machine resource configuration command is used to configure a virtual machine resource. A resource in some embodiments of the present invention includes virtual CPU information, virtual storage resource information, and virtual network resource information that are required by a to-be-created virtual machine. Both the foregoing information and a configuration method are the prior art. For example, when implementation is based on open-source software openstack, this configuration command may be implemented in form of an XML file, and the virtual machine resource is configured using the XML file. If another software platform is used, a corresponding command defined on the other software platform may also be used for implementation, and details are not described herein.

In an embodiment, in addition to the foregoing information, the virtual machine resource configuration command further includes the to-be-created virtual accelerator information, which may be specifically obtained by extending the resource configuration command. For example, based on openstack, an XML file may be extended to include the to-be-created virtual accelerator information.

The to-be-created virtual accelerator information is used to indicate a requirement of a requestor on a virtual accelerator that needs to be created. For example, the information may include: a type of the to-be-created virtual accelerator (for example, encryption, decryption, or compression), an acceleration capability (for example, a capability such as a reachable traffic processing level or a delay control amount), a communications protocol, a communication address, and other information. The communications protocol and the communication address are optional. If a physical accelerator is located on a remote node, the communications protocol and the communication address are required. If a physical accelerator is located on a local node, the information may be omitted.

A "node" in some embodiments of the present invention is generally classified by physical location and may be set based on a system structure, a distance, a requirement, or the like. An equipment room may be a node, a cabinet may also be a node, and a slot and a board may also be nodes. Each node may include a host or may further include a physical accelerator. The host is mainly configured to implement some general service processing, while the physical accelerator accelerates some particular services. At least two nodes are included in communication. For ease of description, one of the two nodes may be referred to as a "local node", and the other may be referred to as a "remote node". For example, in the two nodes, one cabinet C1 may be referred to as a local node, and the other cabinet C2 may be referred to as a remote node. Alternatively, one equipment room H1 may be referred to a local node, and the other equipment room H2 may be referred to as a remote node. It should be noted that concepts such as the foregoing node, host, and accelerator and specific implementation of the concepts (for example, a host is implemented based on a general purpose processor, and a physical accelerator is implemented based on a dedicated hardware device) are concepts known to persons skilled in the art, and details are not described in some embodiments. Because a host is generally implemented based on a CPU, for ease of description, functions implemented by a CPU that are mentioned below may be considered as functions implemented by a host.

Operation 202. The centralized resource manager selects a matched physical accelerator from a physical accelerator resource pool as a matching physical accelerator according to the to-be-created virtual accelerator information in the virtual machine resource configuration command.

For example, if in the to-be-created virtual accelerator information, a required type of a virtual accelerator is encryption and an acceleration capability requires reaching 1 Gbps, a physical accelerator whose accelerator type is encryption and whose acceleration capability can reach 1 Gbps (that is, being greater than or equal to 1 Gbps) is selected from the physical accelerator resource pool as the matching physical accelerator.

In an embodiment, the physical accelerator resource pool is a resource pool including multiple physical accelerators. Implementation forms of these physical accelerators are not limited. For example, the physical accelerators may be PCIe bus-based accelerators, and these accelerators are connected to the CPU using PCIe interfaces. Alternatively, the physical accelerators may be accelerators integrated into the CPU, or network-based accelerators. Specific implementation forms and methods (for example, implementation using chips such as an FPGA or an ASIC) of these physical accelerators are known to persons skilled in the art, and details are not described herein.

Operation 203. The centralized resource manager generates description information describing the matching physical accelerator.

The description information is used to describe the matching physical accelerator and is to be used during subsequent virtual accelerator generation. The concept of the virtual accelerator is similar to concepts of many existing virtual devices (such as a virtual network interface card and a virtual port). That is, the virtual accelerator is a software-virtualized accelerator (that is, a software module) corresponding to a physical accelerator. The "accelerator" simulated using software may transfer some parameters to another application program using some interfaces, so that after receiving these parameters, the other application program considers that there is a real "accelerator", and communicates with the "accelerator". Optionally, to more visually and conveniently use the virtual accelerator, the "virtual accelerator" may be presented on a user interface. A user may operate the "virtual accelerator" on a graphical interface. An application program may send an acceleration request to the "virtual accelerator" when the application program needs to accelerate a service. Then, the virtual accelerator forwards the acceleration request to a matched physical accelerator for processing.

To generate the software module, namely, the "virtual accelerator" corresponding to the matching physical accelerator, the description information needs to be used, that is, to know, according to the description information, a type of the "virtual accelerator" to be generated. The description information includes but is not limited to the following information: the aforementioned information such as the accelerator type and the acceleration capability; some location information used to indicate a location of the accelerator, for example, the information may be a BDF number (a bus number, a device number, and a function number) of the PCIe card when the accelerator is connected, based on a PCIe bus, to the CPU as a PCIe card, or may include an IP address, a port number, or the like information when an accelerator is connected to the CPU via a network; and various attribute information required based on an actual requirement. How to generate the "virtual accelerator" according to the description information is a technology known to persons skilled in the art, and details are not described herein.

For ease of management, the description information may be written into a file and saved. Certainly, the description information may be saved in other manners, such as in a record of a database. How the description information is managed should not be construed to limit embodiments of the present invention.

Operation 204. The centralized resource manager sends a first virtual machine creation command to the virtual machine monitor, where the first virtual machine creation command includes the description information, so that after receiving the first virtual machine creation command, the virtual machine monitor can create a first virtual machine including a first virtual accelerator corresponding to the matching physical accelerator, where the first virtual accelerator is generated using the description information.

Alternatively, operation 204 may be: The centralized resource manager sends a second virtual machine creation command to the virtual machine monitor, where the second virtual machine creation command includes a description information obtaining identifier, so that the virtual machine monitor can create a second virtual machine after receiving the second virtual machine creation command, and the second virtual machine generates a second virtual accelerator after obtaining the description information according to the description information obtaining identifier. The second implementation of operation 204 is shown in a dashed box in FIG. 2, and a corresponding reference numeral is also shown in a dashed box.

In this operation, the virtual machine creation command is a command used to create a virtual machine in the prior art. For example, based on a Linux system, the command shown below may be used:

./x86_64-softmmu/qemu-system-x8664-hda/home/image/VM_KVM_MSG0.img-cpu host-m 2048-smp 4-net nic,model=virtio-net tap,script=/etc/qemu-ifup-nographic-vnc:22

In an embodiment, both the first virtual machine creation command and the second virtual machine creation command are commands based on the virtual machine creation command. To enable the virtual machine monitor to create, according to the description information, the first virtual machine including a virtual accelerator, in some embodiments, the first virtual machine creation command is obtained by making some slight modifications to an original virtual machine creation command and adding a field that can instruct to create the virtual accelerator. For example, the modified command may be shown as follows:

./x86_64-softmmu/qemu-system-x86_64had/home/image/VM_KVM_MSG0.img-cpu host-m 2048-smp 4-net nic, model=virtio-net tap,script=/etc/qemu-ifup-nographic-vnc:22-device ivshmem,shm="sa_vf1",size=1 m The underlined part in the foregoing command is a newly added parameter, indicating that the virtual accelerator is generated by reading a file "sa_vf1" (description information of the to-be-generated virtual accelerator is saved in the file). Certainly, this implementation method is only an example. Persons skilled in the art may directly transfer the description information, but not use the file, to enable the virtual machine monitor to obtain the description information and generate, according to the description information, the first virtual machine including the virtual accelerator corresponding to the description information.

Modifying the existing virtual machine creation command to obtain the second virtual machine creation command is to add the description information obtaining identifier. The identifier does not instruct the virtual machine monitor to generate a virtual accelerator when the virtual machine monitor generates a virtual machine, but instructs the virtual machine monitor to enable the second virtual machine to obtain the description information according to the description information obtaining identifier and generate the virtual accelerator after the virtual machine monitor generates the second virtual machine. The second virtual machine learns from the identifier that the virtual accelerator further needs to be generated, and then obtains the description information at a default location (the location may be alternatively obtained by interacting with the centralized resource manager). For example, a file saved with the description information is obtained from a disk path.

In an embodiment of the present invention, before operation 201, before the centralized resource manager receives the virtual machine resource configuration command, the method may further include:

obtaining, by the centralized resource manager, information of a physical accelerator, where the physical accelerator includes at least a local physical accelerator or a remote physical accelerator; and generating, by the centralized resource manager, a physical accelerator information file according to the information of the physical accelerator to generate the physical accelerator resource pool; and where the selecting, by the centralized resource manager, a matched physical accelerator from a physical accelerator resource pool as a matching physical accelerator according to the to-be-created virtual accelerator information in the virtual machine resource configuration command includes:

selecting, by the centralized resource manager, matched information of the physical accelerator from the physical accelerator information file according to the to-be-created virtual accelerator information, and using a physical accelerator corresponding to the matched information of the physical accelerator as the matching physical accelerator.

The physical accelerator information includes but is not limited to the following information: a physical resource name, an address of a node on which a physical resource is located, and a function, and an attribute, a capability, and an available state of the physical resource. Each node collects and reports physical accelerator information of the node to the centralized resource manager. When a physical accelerator changes, each node may also proactively report to the centralized resource manager, and the centralized resource manager updates the physical accelerator resource pool.

In an embodiment, the centralized resource manager obtains the physical accelerator information, so as to manage and schedule all physical accelerators.

In an embodiment of the present invention, the physical accelerator resource pool is actually equivalent to a database, and data in the physical accelerator resource pool may be one or more physical accelerator information files. Any saving manner of a database may be used as a saving manner of the physical accelerator resource pool. A management structure of the physical accelerator resource pool in an embodiment may be shown in Table 1.

TABLE 1

| Accelerator name | Address of a node on which the accelerator is located | Function | Attribute | Capability | Status |
|---|---|---|---|---|---|
| AE1 | IP address | Function | Feature1 = y/n<br>Feature2 = y/n<br>...<br>Featurek = y/n | Capability1 = a<br>Capability2 = b | Available/<br>Unavailable |

The physical accelerator resource pool shown in Table 1 is shown in a list form. Table 1 lists only one row as an example. Each row in the list may be corresponding to one physical accelerator information file. Each physical accelerator information file is corresponding to one physical accelerator. Alternatively, the entire list is corresponding to one physical accelerator information file. Each row in the list is corresponding to one physical accelerator.

In an embodiment of the present invention, the physical accelerator resource pool is used to manage the physical accelerators in the system, facilitating management on all the physical accelerators and improving efficiency in selection of the matching physical resource.

The following method may further be used to select the matching physical accelerator:

The centralized resource manager selects the matched matching physical accelerator from the physical accelerator resource pool according to the physical accelerator location; and/or the centralized resource manager selects the matched matching physical accelerator from the physical accelerator resource pool according to a physical accelerator load.

Physical accelerators may be divided into local physical accelerators and remote physical accelerators according to physical locations of the physical accelerators. The local physical accelerator is located on a local node, that is, the local physical accelerator is located on a node, where the host is located on the node. The remote physical accelerator is located on a non-host node, that is, the remote physical accelerator is located on a remote node.

In a general case, a delay of communication between the centralized resource manager and the local physical accelerator is relatively short, and a physical accelerator with a relatively light load has a relatively fast response speed. Therefore, the local physical accelerator or the physical accelerator with a relatively light load may be preferentially selected. Alternatively, selection may be made by considering both the physical location and the load of the physical accelerator.

In the accelerator virtualization method according to an embodiment of the present invention, accelerator virtualization can be implemented. In addition, accelerator virtualization in an embodiment of the present invention is implemented based on a centralized resource manager and a virtual machine monitor and requires slight software modification, and therefore is easy to implement.

In some embodiments, a location of a matching physical accelerator is non-limiting. For example, the matching physical accelerator may be located on a local node, or may be located on a remote node. When the matching physical accelerator is located on a local node, the accelerator virtualization method described above may be used. In some embodiments, the matching physical accelerator is located on a remote node. Specifically, in this case, after a virtual machine monitor creates a first virtual machine or a second virtual machine, the accelerator virtualization method can further include:

sending, by the virtual machine monitor, a communication address and a matching physical accelerator identifier to a remote accelerator management unit on a node, where the matching physical accelerator is located on the node, so that the virtual machine monitor communicates with the remote accelerator management unit using the communication address, and the remote accelerator management unit communicates with a corresponding matching physical accelerator using the matching physical accelerator identifier. The remote accelerator management unit may be a function unit that is located on the remote node and that can manage a physical accelerator on the remote node under the control of the centralized resource manager. The remote accelerator management unit may be a separate software module, or may be a software submodule in an operating system of the remote node. The remote accelerator management unit, for example, is a physical acceleration engine.

In many application scenarios, local accelerator resources are extremely limited for an operating system. Therefore, accelerator virtualization imposes a relatively high requirement for a non-local remote accelerator resource. In an embodiment of the present invention, if the matching physical accelerator is not on the host, communication with the matching physical accelerator may be still implemented. That is, in an embodiment of the present invention, when a physical accelerator is located at a remote end, accelerator virtualization can still be implemented, improving a resource sharing degree.

Based on the foregoing embodiments, an embodiment of the present invention discloses an accelerator virtualization method, and the method is used to describe how to process a service based on the foregoing method. Specifically, after a centralized resource manager creates a first virtual machine or a second virtual machine, the method provided in an embodiment further includes:

transferring, a virtual accelerator, an acceleration request to a matching physical accelerator for processing, where the acceleration request is sent by a service unit on a virtual machine; and returning a processing result of the matching physical accelerator to the service unit.

The virtual accelerator in an embodiment is the first virtual accelerator, or may be the second virtual accelerator, and needs to be the same as the virtual accelerator created in operation 204 in the foregoing embodiment. That is, if the first virtual accelerator is created, the first virtual accelerator transfers the acceleration request to the matching physical accelerator for processing, where the acceleration request is sent by the service unit. If the second virtual accelerator is created, the second virtual accelerator transfers the acceleration request to the matching physical accelerator for processing, where the acceleration request is sent by the service unit.

The transferring an acceleration request to a matching physical accelerator for processing, where the acceleration request is sent by a service unit on a virtual machine is equivalent to transferring an acceleration load on the virtual machine to the matching physical accelerator for processing. In this way, a physical resource sharing degree can be improved, and load pressure on the virtual machine and on a host can be reduced.

According to the foregoing embodiment, the matching physical accelerator may be located on a local node, or may be located on a remote node. When the matching physical accelerator is located on a local node, the virtual accelerator receives the acceleration request from the service unit and sends the acceleration request to a local accelerator management unit.

The local accelerator management unit sends the acceleration request to a corresponding matching physical accelerator for processing. After processing the acceleration request, the matching physical accelerator located on the local node feeds back a processing result to the virtual accelerator using the local accelerator management unit, and the virtual accelerator sends the processing result to the service unit.

When the matching physical accelerator is located on a remote node, because there is interaction between the local node and the remote node, the case is more complex. The following describes in detail how to implement load transfer when the matching physical accelerator is not on the host.

Figure 3:
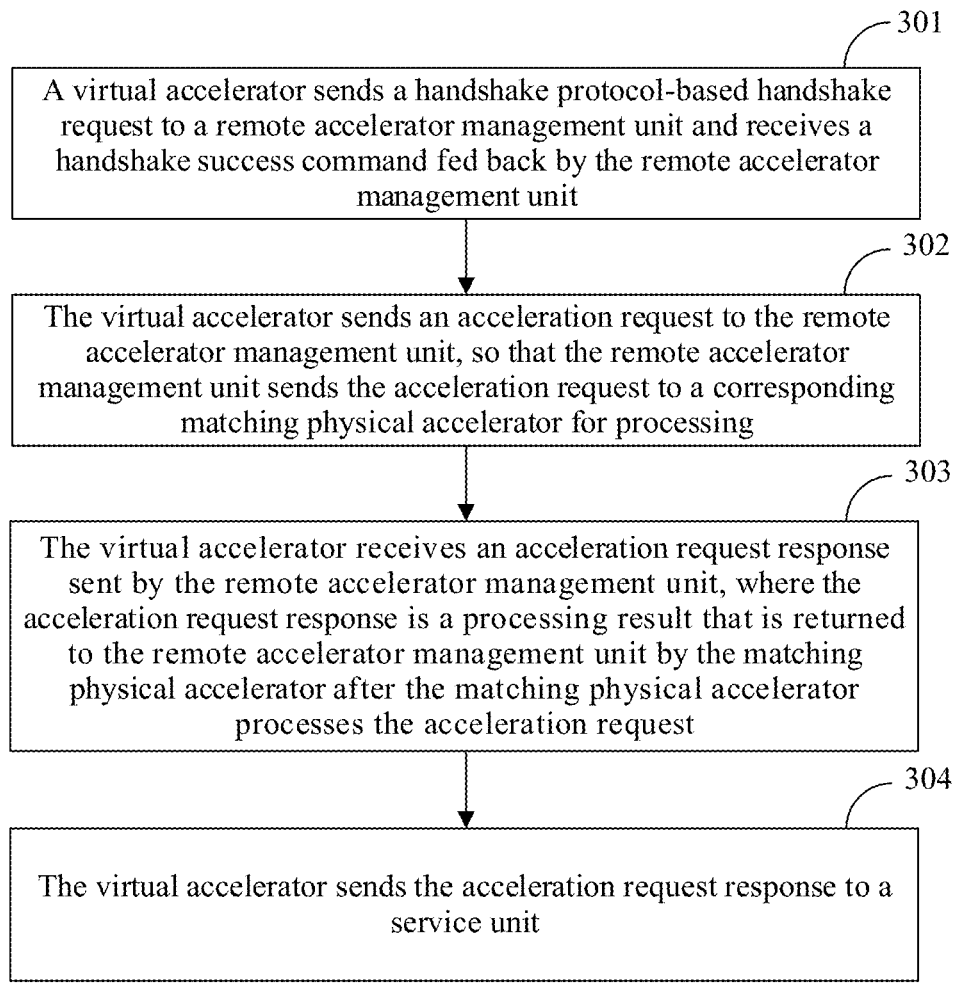
FIG. 3 is a flowchart of a load transfer method according to an embodiment of the present invention.

FIG. 3 is a flowchart of a load transfer method according to an embodiment of the present invention. In one embodiment, the matching physical accelerator is not on the local host, but on the remote node. The method for transferring, by the virtual accelerator, the acceleration request to the matching physical accelerator for processing, where the acceleration request is sent by the service unit on the virtual machine; and returning the processing result of the matching physical accelerator to the service unit is specifically shown in FIG. 3 and includes the following operations.

Operation 301. The virtual accelerator sends a handshake protocol-based handshake request to a remote accelerator management unit and receives a handshake success response fed back by the remote accelerator management unit.

In an embodiment, sending and receiving the handshake protocol-based handshake request is used to establish a connection between the virtual accelerator and the remote accelerator management unit. A specific implementation of sending and receiving the handshake protocol-based handshake request to establish a connection between the virtual accelerator and the remote accelerator management unit is the same as that in the prior art. For example, a TCP handshake protocol-based handshake request may be used for connection establishment, and details are not described herein.

Operation 302. The virtual accelerator sends an acceleration request to the remote accelerator management unit, so that the remote accelerator management unit can send the acceleration request to a corresponding matching physical accelerator for processing.

In actual application, after the connection is established between the virtual accelerator and the remote accelerator management unit, the virtual accelerator may communicate with the remote accelerator management unit. The acceleration request sent by the virtual accelerator is encapsulated into an acceleration request message packet and then is decapsulated during subsequent processing. Encapsulation and decapsulation may use the prior art, and details are not described herein.

The acceleration request may include a request based on a basic communications protocol and a first acceleration request communications protocol. The basic communications protocol may include various prior-art protocols used for communication, for example, the Ethernet protocol or the TCP protocol.

The request based on the first acceleration request communications protocol information includes an acceleration request ID, an acceleration request type, an acceleration request buffer address and length, an acceleration response buffer address and length, acceleration request data, and the like.

The acceleration request ID is used to distinguish different acceleration requests. The acceleration request type may be a graphics acceleration request or a cryptographic acceleration request. The acceleration request buffer address and length and the acceleration response buffer address and length are storage areas that need to be used during processing of the acceleration request. The acceleration request data may be various data included in the accelerator request. The foregoing information is the same as or similar to that in the prior art, and details are not described herein.

Operation 303. The virtual accelerator receives an acceleration request response sent by the remote accelerator management unit, where the acceleration request response is a processing result that is returned to the remote accelerator management unit by the matching physical accelerator after the matching physical accelerator processes the acceleration request.

Operation 304. The virtual accelerator sends the acceleration request response to the service unit.

The acceleration request response may include a response based on a basic communications protocol and a second acceleration request communications protocol. The request based on the second acceleration request communications protocol includes the acceleration request ID, an acceleration operation result, the acceleration request buffer address and length, an acceleration destination data buffer address and length, and acceleration response data.

Information included in the acceleration request response is the same as or similar to the request based on the first acceleration request communications protocol, and details are not repeated herein.

After obtaining the acceleration request response, the virtual accelerator may obtain processed data according to the acceleration request response and release buffers used in the foregoing processing process.

In an embodiment, the virtual accelerator is the first virtual accelerator or the second virtual accelerator, and needs to be the same as the virtual accelerator created in operation 204 in the foregoing embodiment. That is, if the first virtual accelerator is created, the first virtual accelerator transfers the acceleration request to the matching physical accelerator for processing, where the acceleration request is sent by the service unit. If the second virtual accelerator is created, the second virtual accelerator transfers the acceleration request to the matching physical accelerator for processing, where the acceleration request is sent by the service unit.

In an embodiment of the present invention, the transferring an acceleration request to a matching physical accelerator for processing, where the acceleration request is sent by a service unit on a virtual machine is equivalent to transferring an acceleration load on the virtual machine to the matching physical accelerator for processing. In this way, a physical resource sharing degree can be improved, and load pressure on the virtual machine and on a host can be reduced.

Figure 4:
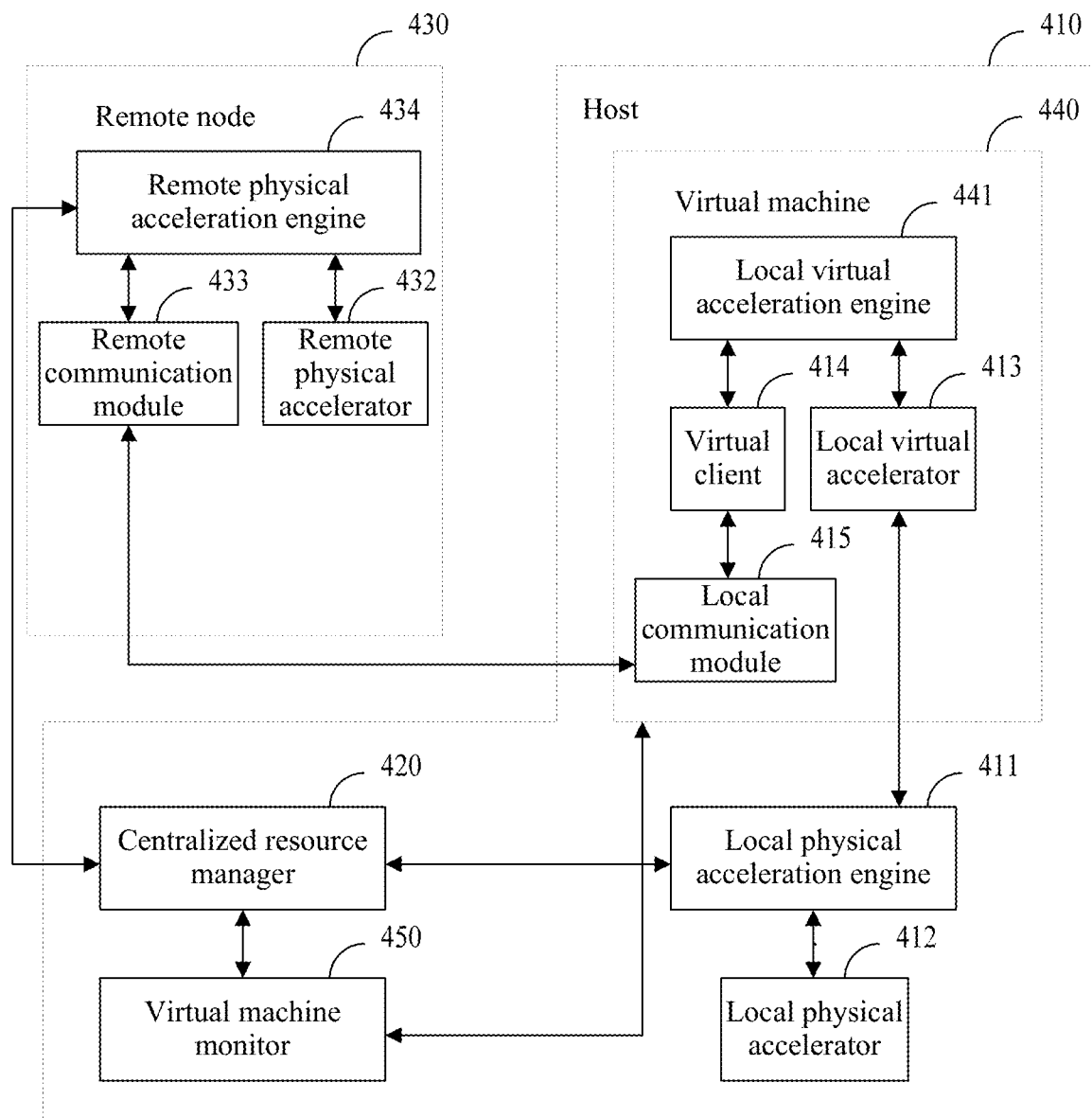
FIG. 4 is a schematic diagram of an application scenario according to an embodiment of the present invention.

Based on the foregoing embodiments, an embodiment provides an application scenario. FIG. 4 is a schematic diagram of the application scenario according to an embodiment of the present invention. As shown in FIG. 4, a host 410 has a requirement for accelerator virtualization. A centralized resource manager 420 and a virtual machine monitor 450 run on the host 410. A local physical acceleration engine 411 and a local physical accelerator 412 are on the host 410. The local physical acceleration engine 411 may manage the local physical accelerator 412 according to a command of the centralized resource manager 420 and transfer an acceleration request of a service unit on the host to the local physical accelerator 412 for processing. It should be noted that, the local physical acceleration engine 411 represents a function module. This part of function may alternatively be implemented by the centralized resource manager in practice (which is equivalent to adding a corresponding function to the centralized resource manager). In an embodiment, the local physical acceleration engine 411 is a function module separate from the centralized resource manager.

The centralized resource manager 420 selects a matching physical accelerator from a physical accelerator resource pool according to a requirement. The selected matching physical accelerator in an embodiment includes the local physical accelerator 412 and/or a remote physical accelerator 432 located on a remote node 430.

The remote node 430 includes a remote physical acceleration engine 434 and the remote physical accelerator 432. The remote physical accelerator engine 434 may manage the remote physical accelerator 432 according to a command of the centralized resource manager 420, and transfer the acceleration request of the service unit on the host 410 to the remote physical accelerator 432 for processing.

In an embodiment of the present invention, a function of the remote physical acceleration engine 434 is the same as that of the remote accelerator management unit in the foregoing embodiment.

The centralized resource manager 420 creates a local virtual accelerator 413 on the host 410. The local virtual accelerator 413 accesses the local physical accelerator 412 using the local physical acceleration engine 411.

The centralized resource manager 420 creates a virtual client 414 on the host 410. The virtual client 414 communicates, using a local communication module 415, with a remote communication module 433 located on the remote node 430 and communicates with the remote physical acceleration engine 434 using the remote communication module 433.

In an embodiment, the virtual client 414 is equivalent to a virtual accelerator.

A communication function of the local communication module 415 may be integrated into the virtual client 414. A communication function of the remote communication module 433 may be integrated into the remote physical acceleration engine 434. After the communication functions are integrated, the local communication module 415 and the remote communication module 433 may be omitted.

In an embodiment, a created virtual machine 440 includes a local virtual acceleration engine 441, the local virtual accelerator 413, the virtual client 414, and the local communication module 415.

In the application scenario according to an embodiment of the present invention, the acceleration request of the service unit on the host 410 may be transferred to the local physical accelerator 412 and/or the remote physical accelerator 432 for processing. In this way, processing efficiency of the host 410 can be improved, a load on the host 410 can be reduced, and a sharing degree of the physical accelerator can be improved.

Figure 5:
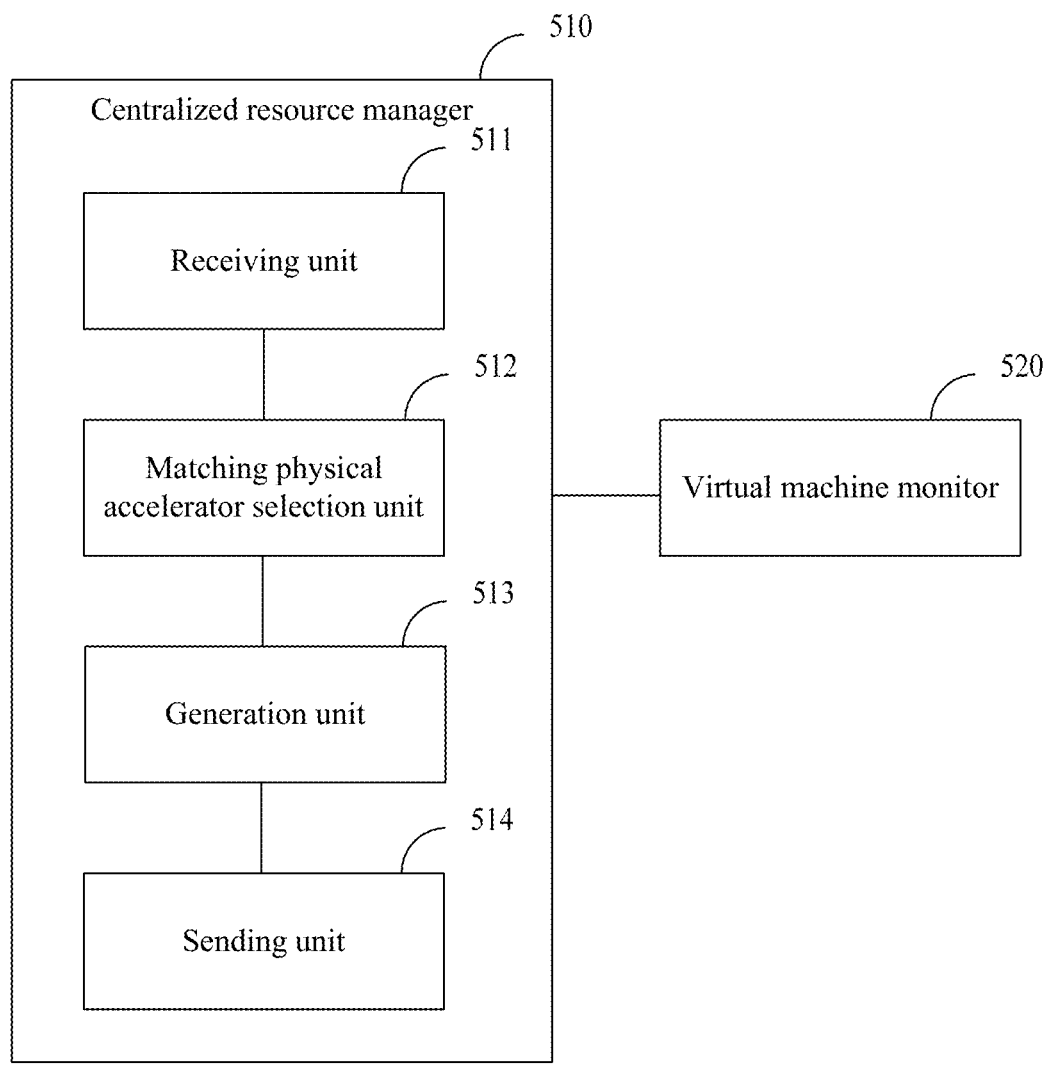
FIG. 5 is a schematic structural diagram of an accelerator virtualization apparatus according to an embodiment of the present invention.

Based on the foregoing embodiments, an embodiment of the present invention discloses an accelerator virtualization apparatus. The apparatus is applied to a host. As shown in FIG. 5, the apparatus includes a centralized resource manager 510 and a virtual machine monitor 520. The centralized resource manager 510 includes:

a receiving unit 511, configured to receive a virtual machine resource configuration command, where the virtual machine resource configuration command includes to-be-created virtual accelerator information;

a matching physical accelerator selection unit 512, configured to select a matched physical accelerator from a physical accelerator resource pool as a matching physical accelerator according to the to-be-created virtual accelerator information in the virtual machine resource configuration command received by the receiving unit 511;

a generation unit 513, configured to generate description information describing the matching physical accelerator; and a sending unit 514, configured to send a first virtual machine creation command to the virtual machine monitor, where the first virtual machine creation command includes the description information, so that after receiving the first virtual machine creation command, the virtual machine monitor can create a first virtual machine including a first virtual accelerator corresponding to the matching physical accelerator, where the first virtual accelerator is generated using the description information; or the sending unit, configured to send a second virtual machine creation command to the virtual machine monitor, where the second virtual machine creation command includes a description information obtaining identifier, so that the virtual machine monitor can create a second virtual machine after receiving the second virtual machine creation command, and the second virtual machine generates a second virtual accelerator after obtaining the description information according to the description information obtaining identifier.

Accelerator virtualization can be implemented using the accelerator virtualization apparatus in some embodiments of the present invention, and is easy to implement.

In an embodiment of the present invention, the centralized resource manager 510 further includes:

a physical accelerator information obtaining unit, configured to obtain information of a physical accelerator, where the physical accelerator includes at least a local physical accelerator or a remote physical accelerator; and a physical accelerator resource pool generation unit, configured to generate a physical accelerator information file according to the information of the physical accelerator to generate the physical accelerator resource pool, and where the matching physical accelerator selection unit 512 is further configured to: select matched information of the physical accelerator from the physical accelerator information file according to the to-be-created virtual accelerator information, and use a physical accelerator corresponding to the matched information of the physical accelerator as the matching physical accelerator.

Optionally, the matching physical accelerator selection unit 512 is further configured to select the matched matching physical accelerator from the physical accelerator resource pool according to the physical accelerator location; and/or the matching physical accelerator selection unit 512 is further configured to select the matched matching physical accelerator from the physical accelerator resource pool according to a physical accelerator load.

Optionally, the matching physical accelerator is not on the host, and after the virtual machine monitor 520 creates the first virtual machine or the second virtual machine, the virtual machine monitor 520 is further configured to send a communication address and a matching physical accelerator identifier to a remote accelerator management unit on a node, where the matching physical accelerator is located on the node, so that the virtual machine monitor 520 communicates with the remote accelerator management unit using the communication address, and the remote accelerator management unit communicates with a corresponding matching physical accelerator using the matching physical accelerator identifier.

Optionally, after the centralized resource manager 510 creates the first virtual machine or the second virtual machine, the virtual accelerator is configured to: transfer an acceleration request to the matching physical accelerator for processing, where the acceleration request is sent by a service unit on the virtual machine, and return a processing result of the matching physical accelerator to the service unit, where the virtual accelerator is the first virtual accelerator or the second virtual accelerator.

Optionally, the matching physical accelerator is not on the host, and the virtual accelerator is further configured to: send a handshake protocol-based handshake request to a remote accelerator management unit and receive a handshake success response fed back by the remote accelerator management unit;

the virtual accelerator is further configured to send the acceleration request to the remote accelerator management unit, so that the remote accelerator management unit can send the acceleration request to a corresponding matching physical accelerator for processing;

the virtual accelerator is further configured to receive an acceleration request response sent by the remote accelerator management unit, where the acceleration request response is the processing result that is returned to the remote accelerator management unit by the matching physical accelerator after the matching physical accelerator processes the acceleration request; and the virtual accelerator is further configured to send the acceleration request response to the service unit, where the virtual accelerator is the first virtual accelerator or the second virtual accelerator.

Accelerator virtualization can be implemented using the accelerator virtualization apparatus in some embodiments of the present invention. This improves a resource sharing degree and is easy to implement.

Figure 6:
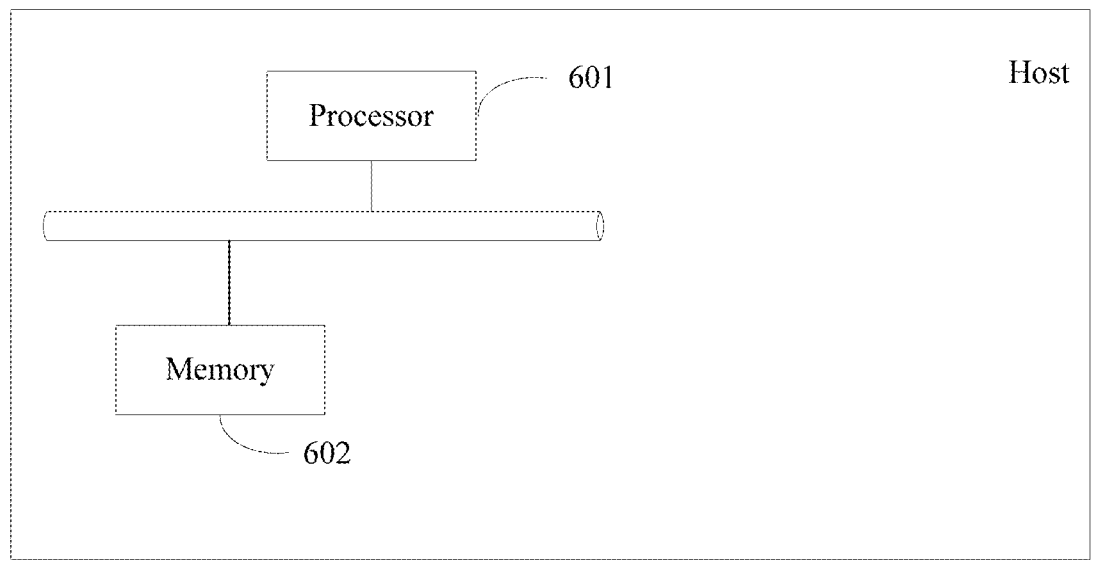
FIG. 6 is a schematic structural diagram of a host according to an embodiment of the present invention.

Based on the foregoing embodiments, an embodiment of the present invention discloses a host. As shown in FIG. 6, FIG. 6 is a schematic structural diagram of the host according to an embodiment of the present invention. The host includes:

a processor 601 and a memory 602. The processor is configured to read code stored in the memory to run a virtual machine monitor and a centralized resource manager. The virtual machine monitor and the centralized resource manager are configured to execute the methods disclosed in the foregoing embodiments.

It may be clearly understood by persons skilled in the art that technologies in the embodiments of the present invention may be implemented by software plus necessary universal hardware, where the universal hardware includes a universal integrated circuit, a universal CPU, a universal memory, a universal device, and the like, and definitely may also be implemented by application-specific hardware, like an application-specific integrated circuit, an application-specific CPU, an application-specific memory, an application-specific device, and the like, but in many cases, the former one is preferred. Based on such an understanding, the technical solutions of the present invention essentially or the part contributing to the prior art may be implemented in a form of a software product. The software product is stored in a storage medium, such as a read-only memory (ROM, Read-Only Memory), a random access memory (RAM, Random Access Memory), a hard disk, or an optical disc, and includes several instructions for instructing a computer device (which may be a personal computer, a server, a network device, or the like) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementations of the present invention, but are not intended to limit the protection scope of the present invention. Any modification, equivalent replacement, or improvement made without departing from the spirit and principle of the present invention shall fall within the protection scope of the present invention.

What is claimed is:

1. An accelerator virtualization method, the method comprising:
   receiving, by a centralized resource manager, a virtual machine resource configuration command having to-be-created virtual accelerator information;
   selecting, by the centralized resource manager from a physical accelerator resource pool, a physical accelerator matching the to-be-created virtual accelerator information as a matching physical accelerator;
   generating, by the centralized resource manager, description information describing the matching physical accelerator; and sending, by the centralized resource manager, a first virtual machine creation command to a virtual machine monitor, wherein the first virtual machine creation command comprises the description information, so that after receiving the first virtual machine creation command, the virtual machine monitor can create a first virtual machine comprising a first virtual accelerator corresponding to the matching physical accelerator, wherein the first virtual accelerator is created using the description information; or sending, by the centralized resource manager, a second virtual machine creation command to the virtual machine monitor, wherein the second virtual machine creation command comprises a description information obtaining identifier, so that the virtual machine monitor can create a second virtual machine after receiving the second virtual machine creation command, and the second virtual machine generates a second virtual accelerator after obtaining the description information according to the description information obtaining identifier.

2. The method according to claim 1, wherein before the receiving, by the centralized resource manager, a virtual machine resource configuration command, the method further comprises:

obtaining, by the centralized resource manager, information of a physical accelerator, wherein the physical accelerator comprises at least a local physical accelerator or a remote physical accelerator; and generating, by the centralized resource manager, a physical accelerator information file according to the information of the physical accelerator to generate the physical accelerator resource pool, and wherein the selecting, by the centralized resource manager from a physical accelerator resource pool, a physical accelerator matching the to-be-created virtual accelerator information comprises:

selecting, by the centralized resource manager, matched information of the physical accelerator from the physical accelerator information file according to the to-be-created virtual accelerator information, and using a physical accelerator corresponding to the matched information of the physical accelerator as the matching physical accelerator.

3. The method according to claim 2, wherein the selecting, by the centralized resource manager, a matched physical accelerator from a physical accelerator resource pool as a matching physical accelerator, comprises:

selecting, by the centralized resource manager, the matching physical accelerator from the physical accelerator resource pool according to a physical accelerator location; or selecting, by the centralized resource manager, the matching physical accelerator from the physical accelerator resource pool according to a physical accelerator load.

4. The method according to claim 1, wherein the matching physical accelerator is not on a host, and after the virtual machine monitor creates the first virtual machine or the second virtual machine, the method further comprises:

sending, by the virtual machine monitor, a communication address and a matching physical accelerator identifier to a remote accelerator management unit on a node, wherein the matching physical accelerator is located on the node, so that the virtual machine monitor communicates with the remote accelerator management unit using the communication address, and the remote accelerator management unit communicates with a corresponding matching physical accelerator using the matching physical accelerator identifier.

5. The method according to claim 1, wherein after the virtual machine monitor creates the first virtual machine or the second virtual machine, the method further comprises:

transferring, by the virtual accelerator, an acceleration request to the matching physical accelerator for processing, wherein the acceleration request is sent by a service unit on the virtual machine; and returning a processing result of the matching physical accelerator to the service unit, wherein the virtual accelerator is the first virtual accelerator or the second virtual accelerator.

6. The method according to claim 5, wherein the matching physical accelerator is not on a host, and the transferring, by the virtual accelerator, an acceleration request to the matching physical accelerator for processing further comprises:

sending, by the virtual accelerator, the acceleration request to a remote accelerator management unit, so that the remote accelerator management unit can send the acceleration request to a corresponding matching physical accelerator for processing;

receiving, by the virtual accelerator, an acceleration request response sent by the remote accelerator management unit, wherein the acceleration request response comprises the processing result that is returned to the remote accelerator management unit by the matching physical accelerator after the matching physical accelerator processes the acceleration request; and sending, by the virtual accelerator, the acceleration request response to the service unit.

7. An accelerator virtualization apparatus comprising a centralized resource manager and a virtual machine monitor in communication with the centralized resource manager, wherein the centralized resource manager comprises:

a receiving unit, configured to receive a virtual machine resource configuration command having to-be-created virtual accelerator information;

a matching physical accelerator selection unit, configured to select a matched physical accelerator from a physical accelerator resource pool as a matching physical accelerator according to the to-be-created virtual accelerator information;

a generation unit, configured to generate description information describing the matching physical accelerator; and a sending unit, configured to send a first virtual machine creation command to the virtual machine monitor, wherein the first virtual machine creation command comprises the description information, so that after receiving the first virtual machine creation command, the virtual machine monitor can create a first virtual machine comprising a first virtual accelerator corresponding to the matching physical accelerator, wherein the first virtual accelerator is created using the description information; or a sending unit, configured to send a second virtual machine creation command to the virtual machine monitor, wherein the second virtual machine creation command comprises a description information obtaining identifier, so that the virtual machine monitor can create a second virtual machine after receiving the second virtual machine creation command, and the second virtual machine generates a second virtual accelerator after obtaining the description information according to the description information obtaining identifier.

8. The apparatus according to claim 7, wherein the centralized resource manager further comprises:
a physical accelerator information obtaining unit, configured to obtain information of a physical accelerator, wherein the physical accelerator comprises at least a local physical accelerator or a remote physical accelerator; and
a physical accelerator resource pool generation unit, configured to generate a physical accelerator information file according to the information of the physical accelerator to generate the physical accelerator resource pool, and wherein
the matching physical accelerator selection unit is further configured to:
select matched information of the physical accelerator from the physical accelerator information file according to the to-be-created virtual accelerator information, and use a physical accelerator corresponding to the matched information of the physical accelerator as the matching physical accelerator.

9. The apparatus according to claim 8, wherein the matching physical accelerator selection unit is further configured to select the matching physical accelerator from the physical accelerator resource pool according to a physical accelerator location; or
the matching physical accelerator selection unit is further configured to select the matching physical accelerator from the physical accelerator resource pool according to a physical accelerator load.

10. The apparatus according to claim 7, wherein the matching physical accelerator is not on a host, and after the virtual machine monitor creates the first virtual machine or the second virtual machine, the virtual machine monitor is further configured to send a communication address and a matching physical accelerator identifier to a remote accelerator management unit on a node, wherein the matching physical accelerator is located on the node, so that the virtual machine monitor communicates with the remote accelerator management unit using the communication address, and the remote accelerator management unit communicates with a corresponding matching physical accelerator using the matching physical accelerator identifier.

11. The apparatus according to claim 7, wherein after the virtual machine monitor creates the first virtual machine or the second virtual machine, the virtual accelerator is further configured to:
transfer an acceleration request to the matching physical accelerator for processing, wherein the acceleration request is sent by a service unit on the virtual machine, and
return a processing result of the matching physical accelerator to the service unit, wherein the virtual accelerator is the first virtual accelerator or the second virtual accelerator.

12. The apparatus according to claim 11, wherein the matching physical accelerator is not on a host, and wherein the virtual accelerator is further configured to send the acceleration request to a remote accelerator management unit, so that the remote accelerator management unit can send the acceleration request to a corresponding matching physical accelerator for processing;
the virtual accelerator is further configured to receive an acceleration request response sent by the remote accelerator management unit, wherein the acceleration request response is the processing result that is returned to the remote accelerator management unit by the matching physical accelerator after the matching physical accelerator processes the acceleration request; and
the virtual accelerator is further configured to send the acceleration request response to the service unit.

13. A centralized resource manager of an accelerator virtualization apparatus, the centralized resource manager comprises:
a receiver, configured to receive a virtual machine resource configuration command having to-be-created virtual accelerator information;
a processor, configured to select a physical accelerator from a physical accelerator resource pool as a matching physical accelerator according to the to-be-created virtual accelerator information, wherein
the processor is further configured to generate description information describing the matching physical accelerator; and
a sender, configured to send a first virtual machine creation command to a virtual machine monitor, wherein the first virtual machine creation command comprises the description information, so that after receiving the first virtual machine creation command, the virtual machine monitor can create a first virtual machine comprising a first virtual accelerator corresponding to the matching physical accelerator, wherein the first virtual accelerator is created using the description information; or
the sender, alternatively configured to send a second virtual machine creation command to the virtual machine monitor, wherein the second virtual machine creation command comprises a description information obtaining identifier, so that the virtual machine monitor can create a second virtual machine after receiving the second virtual machine creation command, and the second virtual machine generates a second virtual accelerator after obtaining the description information according to the description information obtaining identifier.

14. The centralized resource manager according to claim 13, wherein the processor is further configured to: obtain information of the physical accelerator before the centralized resource manager receives the virtual machine resource configuration command, wherein the physical accelerator comprises at least a local physical accelerator or a remote physical accelerator; and generate a physical accelerator information file according to the information of the physical accelerator, so as to generate the physical accelerator resource pool, and wherein
the processor is further configured to: select matched information of the physical accelerator from the physical accelerator information file according to the to-be-created virtual accelerator information, and use a physical accelerator corresponding to the matched information of the physical accelerator as the matching physical accelerator.

15. The centralized resource manager according to claim 14, wherein the processor is further configured to select the matching physical accelerator from the physical accelerator resource pool according to a physical accelerator location; or
the processor is further configured to select the matching physical accelerator from the physical accelerator resource pool according to a physical accelerator load.

* * * * *